United States Patent

Watanabe et al.

[11] Patent Number: 5,237,440
[45] Date of Patent: Aug. 17, 1993

[54] METHOD OF MANUFACTURING A LIQUID CRYSTAL DISPLAY PANEL

[75] Inventors: Hiroshi Watanabe, Yawata; Kazuo Yokoyama; Nobuyasu Yamagishi, both of Hirakata, all of Japan

[73] Assignee: Matsushita Electric Industrial Co., Ltd., Osaka, Japan

[21] Appl. No.: 506,153

[22] Filed: Apr. 9, 1990

[30] Foreign Application Priority Data

Apr. 14, 1989 [JP] Japan .................................... 1-95778

[51] Int. Cl.$^5$ ................................................ G02F 1/13
[52] U.S. Cl. ........................................ 359/90; 359/44; 252/299.01
[58] Field of Search ................... 350/346, 351, 331 T, 350/339 F, 350 S, 334; 359/43, 44, 90, 68, 66

[56] References Cited

U.S. PATENT DOCUMENTS

| | | | |
|---|---|---|---|
| 4,561,726 | 12/1985 | Goodby et al. | 350/341 |
| 4,653,857 | 3/1987 | Crossland et al. | 350/351 |
| 4,675,699 | 6/1987 | Kan et al. | 350/351 |
| 4,702,558 | 11/1987 | Coles et al. | 350/351 |
| 4,763,992 | 8/1988 | Takada et al. | 350/331 T |
| 4,775,226 | 10/1988 | Montgomery, Jr. et al. | 350/351 |
| 4,799,770 | 1/1989 | Kahn et al. | 359/43 |
| 4,904,066 | 2/1990 | Gray et al. | 350/350 S |
| 4,941,736 | 7/1990 | Taniguchi et al. | 350/350 S |
| 4,964,700 | 10/1990 | Takabayashi | 350/350 S |
| 4,965,591 | 10/1990 | Kurabayashi et al. | 359/43 |
| 5,040,879 | 8/1991 | Haven | 359/45 |
| 5,066,107 | 11/1991 | Yoshinaga et al. | 359/43 |

FOREIGN PATENT DOCUMENTS

| | | |
|---|---|---|
| 0348939 | 1/1990 | European Pat. Off. ............. 359/43 |
| 2233680 | 1/1974 | Fed. Rep. of Germany . |
| 3605147 | 8/1986 | Fed. Rep. of Germany . |

Primary Examiner—Rolf Hille
Assistant Examiner—Tan Ho
Attorney, Agent, or Firm—Stevens, Davis, Miller & Mosher

[57] ABSTRACT

Molecules of the liquid crystal material of the liquid crystal display panel are oriented along the rubbing directions of the upper and lower substrates, and the orientation thereof tends to be twisted in one direction. The reverse domain wherein the orientation is twisted in the reverse direction occurs at portions of the liquid crystal. Though the reverse domain may be prevented form occurring by rubbing the substrates more strongly, it is impossible to sufficiently rub the surfaces of the respective substrates since the substrates are provided with picture element electrodes thereon so that the surfaces are uneven. The liquid crystal display panel is heated to a transformation point so as to change into an isotropic phase after filling the liquid crystal, then is cooled rapidly. This enables a liquid crystal display panel to be obtained in which the twisted directions of the orientation of the liquid crystal molecules are uniform.

4 Claims, 5 Drawing Sheets

METHOD OF MANUFACTURING A LIQUID CRYSTAL DISPLAY PANEL

BACKGROUND OF THE INVENTION

1. Industrial Field of the Invention

The present invention relates to a method of manufacturing a liquid crystal display panel, and also relates to a liquid crystal display panel apparatus having an improved image quality.

2. Description of the Prior Art

A typical twist-nematic liquid crystal display panel is, for example, constituted as shown in FIG. 12. In such conventional display panel, an upper substrate 3 is formed with a color filter 2 thereon and a lower substrate 5 is formed with picture element electrodes 4 thereon, between which liquid crystal 1 is interposed. Polarizing plates 6 and 7 are located respectively on the outsides of the upper and the lower substrates 3 and 5. In order to apply orientation to the liquid crystal 1, the upper and the lower substrates 3 and 5 are coated with an alignment film of polymeric materials (for example, polyimide and so on) and rubbed with cloths. The directions of rubbing the upper and the lower substrates 3 and 5 cross each other at an angle of 90°. For this reason, molecules of the liquid crystal 1 are arranged along the alignment directions of the upper and the lower substrates and the arrangements are twisted as shown in FIGS. 13a and 13b. The twisted directions of the arrangements of the molecules of the liquid crystal should be the same anywhere in the liquid crystal display panel. However, a defect, referred to as a reverse domain in which the twisted direction is reversed, partially takes place due to a flowing effect when pouring the liquid crystal 1 into the panel. Ordinarily, as a measure to cope with this defect, a well known method is to fill the liquid crystal 1 into the panel after raising the temperature thereof higher than the N-I point (a transformation point from a nematic phase to an isotropic phase and at the temperature of the N-I point, the liquid crystal 1 becomes isotropic and transparent), that is to say, after making the liquid crystal 1 isotropic. Another method is to pour the liquid crystal 1 into the panel, prior to heating in order to make the liquid crystal 1 isotropic, and then to avoid causing the reverse domain by naturally cooling the liquid crystal 1.

A liquid crystal display panel has been manufactured by the above-described conventional method without hindrance. However, whereas a tendency toward high definition images has recently advanced, and a liquid crystal display panel of an active matrix type in which every picture element is provided with a thin film transistor has been developed. Further, an area of the picture element is decreased so as to increase the density of the panel. In this case, as shown in FIG. 14, the smaller the area of the picture element, the less the contact force of the rubbing cloth against the picture element surface becomes due to convex or concave portions formed by the thin film transistor 9 and a source wiring 10. As a result, the strength of orientation of the liquid crystal 1 is weakened and the reverse domain can easily occur. It is impossible to eliminate the weakness in orientation force of the liquid crystal and the occurrence of the reverse domain due to the configurational effect of the convex or concave portions formed by the thin film transistor and the source wiring, through the conventional heat treatment method.

As a measure of coping with this reverse domain, a method has conventionally been employed such that a swirling force of the liquid crystal is strengthened by adding to the liquid crystal a small amount of swirling material referred to as cholesteric liquid crystal (for example, CB15; CHISSO CORPORATION). Too great an increase in the amount of the swirling material added to the liquid crystal results in a characteristic deterioration so that a rate in responsibility of the liquid crystal is decreased. Therefore, there is a limit to which this material may be added.

As disclosed in the liquid crystal display panel apparatus (Japanese Patent Unexamined Publication No. 59-21380), there has been also proposed a method in which the liquid crystal molecules are arranged in bilateral helical rotational directions. However, the results of this method are not fully known or predictable.

SUMMARY OF THE INVENTION

In order to solve the above-mentioned problem, the present invention aims to provide a method of manufacturing a liquid crystal display panel and a liquid crystal display panel apparatus having an improved image quality in which the reverse domain can be prevented from occurring readily and securely.

The prevent invention prevents the reverse domain from occurring by cooling a panel filled with liquid crystal from a side of one of the upper and lower substrates after heating the panel so as to make the liquid crystal isotropic.

When the liquid crystal in the panel recovers to an anisotropic state from the isotropic state by the above-described measures, a domain in a normal swirling direction is promoted and a range of the reverse domain is prevented from enlarging. At the same time, a force for absorbing the reverse domain is generated in the normal domain, thereby extinguishing the reverse domain.

These and other objects and advantages of the present invention will become clear from the following description of the preferred embodiments.

DETAILED DESCRIPTION OF THE PREFERRED EMBODIMENTS

Figure 1:
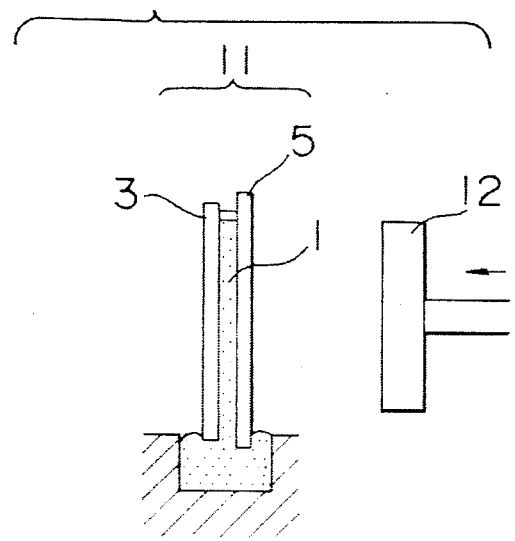
FIG. 1 is a cross-sectional view illustrating a liquid crystal display panel in a phase such that the liquid crystal is filled, according to a method of manufacturing a liquid crystal panel of one embodiment of the present invention.
Figures 13A, 13B:
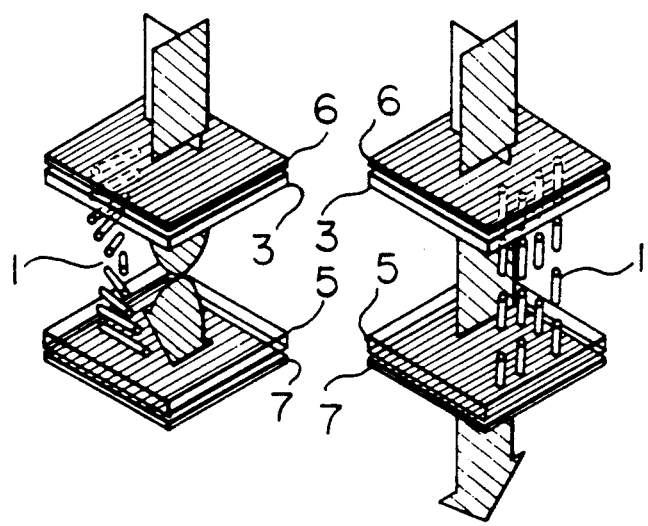
FIGS. 13a and 13b are perspective views showing a twisted direction of a liquid crystal.
Figure 14:
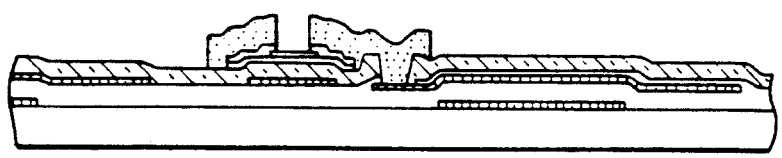
FIG. 14 is a cross-sectional view illustrating an element substrate.

Preferred embodiments of the present invention will be described hereinafter with reference to FIGS. 1 to 11. FIG. 1 is a cross-sectional view of a liquid crystal display panel 11 when liquid crystal 1 is filled into the panel 11. As shown in FIGS. 13a and b in a conventional instance, the liquid crystal molecules have arrangements twisted by about 90° between an upper and a lower substrates 3 and 5. Before the liquid crystal 1 is filled in the panel 11, the temperature of the liquid crystal 1 is raised to an extent such that the liquid crystal becomes isotropic (for example, if twist-nematic liquid crystal is LIXON-9150; CHISSO CORPORATION, the temperature is higher than the N-I point of 88° C. which is a transient point between the anisotropic state and the isotropic state of the twist-nematic liquid crystal), and the panel 11 is also heated to a temperature higher than 88° C. Under this condition, the liquid crystal 1 is filled into the panel 11 (the filling method is, for example, a vacuum filling method; as in Japanese Patent Examined Publication No. 58-49853). The liquid crystal 1 at this time is isotropic and in a state where it receives no influence in an alignment direction or a swirling direction of the substrates, i.e., a neutral state.

In the next step, after filling the liquid crystal, an inlet is coated with a sealing agent and the panel 11 is cooled. In this case, the liquid crystal 1 is not changed into a nematic phase simultaneously everywhere in the panel 11 in the cooling process, but is gradually changed into a localized nematic phase from a portion thereof which is early cooled, at the point passing the N-I point. During this change, the liquid crystal which is isotropic or in the neutral state is swirled both clockwise and counterclockwise as the swirling forces in the clockwise and counterclockwise directions are generally equal to each other. Accordingly, even when the arrangements of the liquid crystal 1 are designed to be twisted in the clockwise direction by setting an adding amount of cholesteric liquid crystal and an alignment direction, a reverse domain in which the arrangements of the liquid crystal 1 are twisted counterclockwise locally occurs at the transformation point in the cooling process. The occurrence condition of the reverse domain is shown in FIG. 2.

Figure 2:
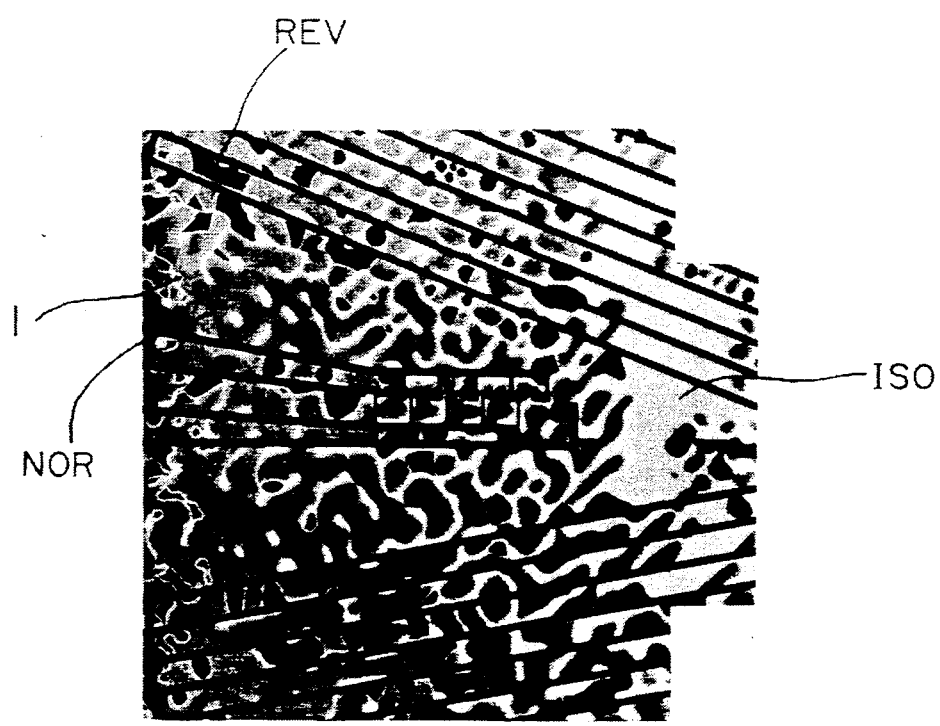
FIG. 2 is an enlarged view showing a part of a liquid crystal panel in an occurrence condition of a reverse domain at a transformation point in the cooling process of the liquid crystal.

FIG. 2 indicates a part of the liquid crystal panel in a state where the liquid crystal 1 in the panel 11 which has been heated to make it isotropic is changing from the isotropic state to an anisotropic nematic phase, in which there are formed a liquid crystal drive wiring pattern P and a shielding mask M. This figure shows the liquid crystal display panel in a two hundred times magnification scale. The cooling of the liquid crystal proceeds from the left to the right in the drawing. In FIG. 2, white portions (ISO) indicate a state where the liquid crystal 1 is isotropic and transparent. The liquid crystal is changing into a normal clockwise-twist nematic phase at grey portions (NOR) and the reverse domain occurs at black portions (REV), where the arrangements of the liquid crystal is twisted in the counterclockwise direction.

Successively, a localized range of this reverse domain (REV) is extended similarly to the normal domain (NOR) as the liquid crystal 1 is cooled. When the liquid crystal is transformed into the nematic phase, an extension range of the normal clockwise-twist nematic phase is larger than that of the counterclockwise-twist nematic phase. As a result, in a conventional liquid crystal display panel whose picture element area is large and which has a strong orientation strength, the normal domain absorbs the reverse domain. However, in a liquid crystal display panel whose substrates are uneven and which has a weak orientation strength such as a high density panel, the force of the normal domain (NOR) is weak, and further if a cooling rate is small as in the natural cooling, the range of the reverse domain (REV) enlarges so that the normal domain (NOR) cannot absorb the reverse domain (REV). The absorbing force depends on the orientation strength, the relative evenness of the substrates and the liquid crystal material. Specifically, if the orientation strength is weak and the unevenness of the substrates is considerable, a discrimination line of the reverse domain is caught by the concave or convex portions, which results in remaining of the reverse domain (REV). Accordingly, it is required to prevent the reverse domain from enlarging during the cooling process and to enhance the normal clockwise-twist nematic phase rapidly. In view of this problem, after earnest study and several experiments, the applicants have found that it is possible to prevent the reverse domain from occurring by increasing the cooling rate.

Thus, the substrate 5 on the picture element side where the orientation strength becomes weaker than that of the color filter substrate 3 due to an evenness of the element and where a thin film transistor is formed is brought into contact with a member 12 (for example, a metallic plate) for rapidly cooling the substrate 5 by making use of heat conductivity. This prevents the reverse domain from occurring.

Figure 3:
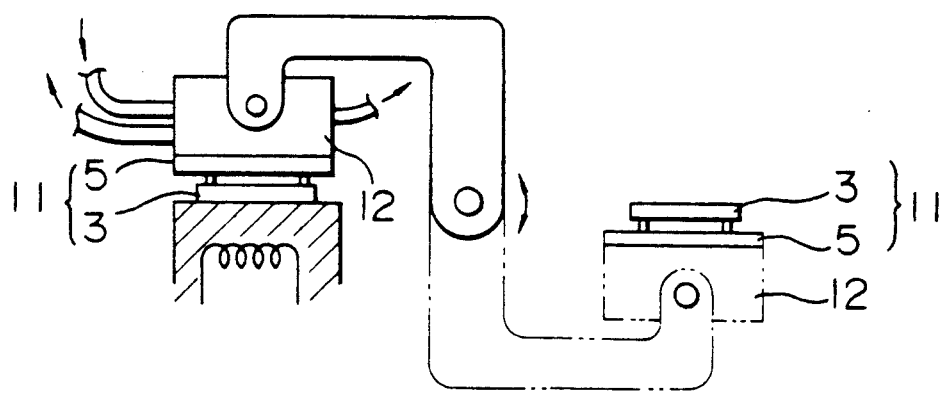
FIG. 3 is a cross-sectional view illustrating a device for cooling a liquid crystal in a liquid crystal panel.
Figure 4:
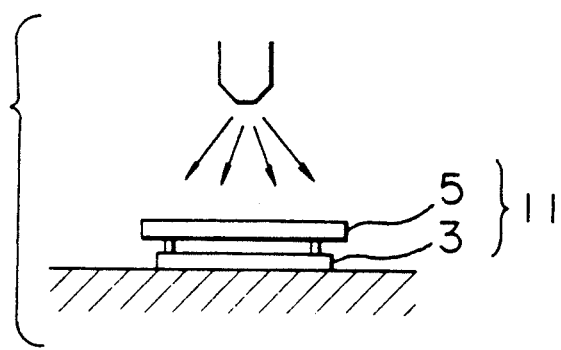
FIG. 4 is a cross-sectional view illustrating a device for cooling a liquid crystal with the use of heating conduction.
Figure 5:
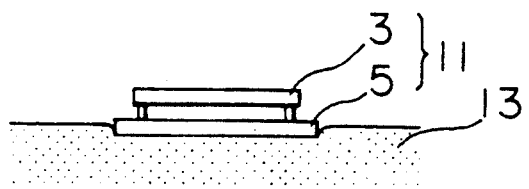
FIG. 5 is a cross-sectional view showing a device for cooling a liquid crystal with the use of a refrigerant.

FIG. 3, shows panel 11 sealed after filling the liquid crystal, which may be heated and then cooled. In this case, it is unnecessary to heat the liquid crystal during filling. Further in this case, the period of time of heating the liquid crystal can be shorter than that in the former case in which the liquid crystal is heated for more than 10 minutes during filling. This method is particularly effective in the liquid crystal whose characteristics are deteriorated due to volatilization by heating. That is, the liquid crystal can be heated in a short period of time. Specifically, if the liquid crystal is the above-mentioned LIXON-9150, it is sufficient to heat it for about twenty seconds on a hot plate at a temperature of 9° C. As measures for cooling the heated panel 11, methods may be employed such as to release heat of the panel 11 through a heat transmission of the panel which is cooled by means of a cooling plate 12 (water-cooled or gas-cooled), or to directly spray cooling water or to direct air onto the element substrate 5 as shown in FIG. 4. Further, as illustrated in FIG. 5, the substrate 5 may be dipped in cooling water 13 (liquid other than water may be also used).

Figure 6:
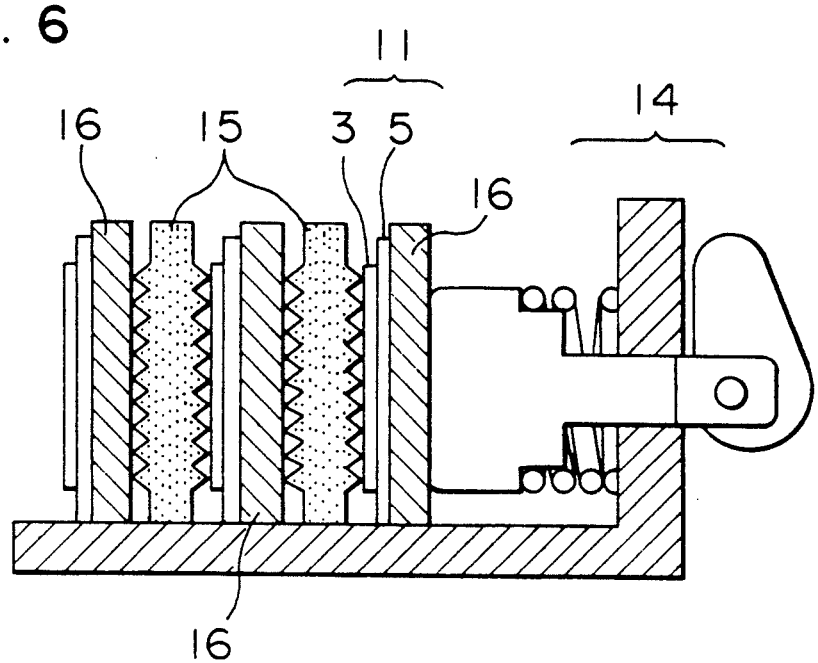
FIG. 6 is a cross-sectional view illustrating a device for cooling a liquid crystal with the use of a clamping jig.

Further, the panel 11 may be cooled by being pressed by a clamping jig 14 as shown in FIG. 6. The clamping jig 14 comprises a first member 15 in contact with the substrate 3 on the color filter side of the panel 11, the first member being formed from a material having a poor heat conductivity (e.g., an elastic body of fluoro-rubber), and a second member 16 on the picture element side, the second member being formed of a material having a good heat conductivity (i.e., a metal such as aluminum). A spring force is applied to the panel to press the same by rotating a handle of the clamping jig. With this clamping jig 14, the panel 11 can go through process stations in a state in which it is incorporated in the jig 14 before filling of the liquid crystal. Through the process of filling the liquid crystal and sealing the inlet, the panel 11 is brought into a heating process. Subsequently, if the clamping jig 14 is cooled in a cooling process, the panel 11 is cooled from the element substrate 5 side due to a difference in heat conductivity between the first and second members of the clamping jig. Also, a degree of adhesion between the panel 11 and the second member 16 is increased by pressing the panel, to thereby improve an efficiency of heat conductivity.

In an experiment involving the cooling rate, an aluminum material whose surface is oxidized and has a preferable heat conductivity was used, while the temperatures of the panel and the cooling plate 12 were set to about 100° C. and 20° C., respectively. When the element substrate 5 of the panel 11 was adhered to or placed in contact with the cooling plate 12, the liquid crystal 1 within the panel changed from an isotropic state to an anisotropic state in about twenty seconds so that occurrence of the reverse domain was decreased. Since the N-I point is 88° C., the cooling rate can be calculated as (100° C.−88° C.)/20 sec. so as to obtain 0.6° C./sec which can be rounded to 1° C. Further, when the element substrate 5 of the heated panel was dipped in the water with ice 13 (the temperature thereof is about 3° C.), the liquid crystal within the panel 11 changed from an isotropic state to an anisotropic state in about five seconds (a cooling rate of about 2.4° C./sec.) so that the reverse domain did not occur.

One example of results of these experiments is shown in Table 1. This table indicates that a difference in orientation between the substrates is clarified by adding an amount of cholesteric liquid crystal material by which the reverse domain appears more remarkably, though the orientations of the substrates are different from each other due to rubbing conditions or the like. As seen from Table 1, it was confirmed that the rapid cooling was effective in decreasing the occurrence of the reverse domain and further that the occurrence of the reverse domain could be prevented by rapidly cooling the panel from the element 5 side. According to this method of cooling the panel rapidly, since the liquid crystal can change into a normal nematic phase even if no (or a very small amount of) cholesteric liquid crystal is added to the liquid crystal in the panel, it is possible to manufacture a liquid crystal display panel having a high quality, regardless of blending of the liquid crystal and degrees of orientations of the substrates of the panel. This invention is applicable to evaluating a degree of orientation of a substrate by rubbing or the like. In this case, the evaluation is made on the basis of a rate of occurrence of the reverse domain when the cooling rate of the panel is changed.

TABLE 1

Occurrence Condition of Reverse Domain

| Cooling Method | Adding Amount of Cholesteric Liquid Crystal | | |
|---|---|---|---|
| | 0 | 0.1 | 0.2 |
| Gradually Cooling in a Chamber | frequent | frequent | frequent |
| Rapid Cooling of Color Filter Substrate (Contact with Aluminum at 20° C.) | frequent | slight | slight |
| Rapid Cooling of Element Substrate (Contact with Aluminum at 20° C.) | slight | no | no |
| Rapid Cooling of Element Substrate (Dipping in Water with Ice at 3° C.) | no | no | no |

One embodiment of the cooling method for prevention of the reverse domain has been described above. However, the technical results can be improved, provided that the following heating means is further used for mass production or high quality.

Figure 7:
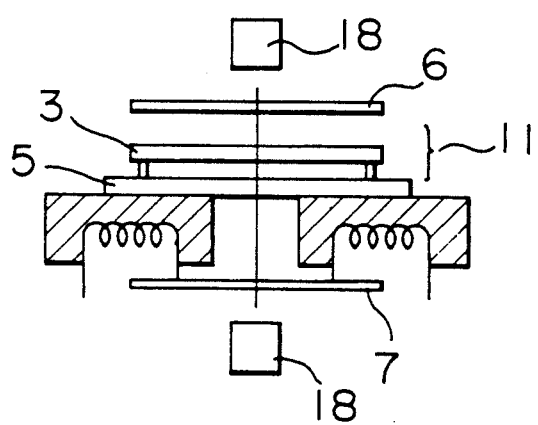
FIGS. 7 and 8 are cross-sectional views illustrating a device for cooling a liquid crystal, in which a detection means is provided.

In manufacturing the liquid crystal display panel, various kinds of defects in image quality occur, in addition to the reverse domain. One of the defects requires heat treatment at high temperature after filling of the liquid crystal 1. In this case, even if the measure for prevention of the reverse domain is taken immediately after filling the liquid crystal, the panel must be cooled from the picture element side at the time of heat treatment at a high temperature. Accordingly, when the prevention process of the reverse domain is carried out after the heat treatment at a high temperature, the panel is heated from the color filter substrate 3 side and a detection means such as an optical sensor 18 for detection of an amount of transmitted light is provided on a part of the panel 11 as shown in FIG. 7 in order to control a process in which the liquid crystal changes from an anisotropic state to an isotropic state by heating, thereby making it possible to control the time of heating in a short time period, securely.

Figure 8:
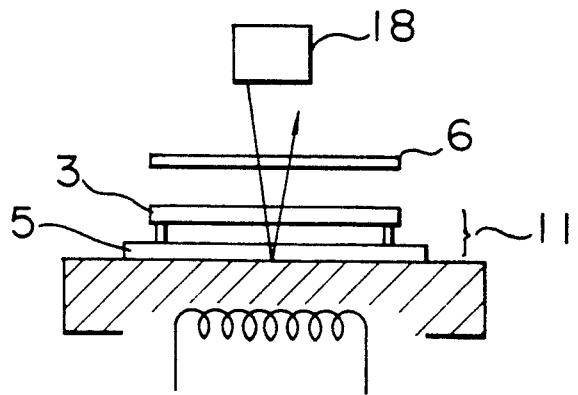

In the cooling process, the transformation of the liquid crystal into a nematic phase by way of the N-I point can be recognized, so that the liquid crystal is not cooled unnecessarily. At this time, polarizing plates 6 and 7 are located on and underneath the panel 11, respectively. These polarizing plates 6 and 7 may be located in order to fit either a normally-black or normally-white display panel. In the normally-black display panel which does not normally allow light to transmit, the light is transmitted when the liquid crystal becomes isotropic, while in the normally-white display panel which normally allows light to transmit, the light is interrupted when the liquid crystal becomes isotropic. Whether the light is transmitted or not is detected by, for example, the optical sensor or sensors 18. This detection may be carried out by transmitting light through the panel as in FIG. 7 or by letting the panel reflect light as shown in FIG. 8. After that, the panel 11 is adhered on the picture element substrate 5 side thereof in order to be cooled. In this construction, it is possible to prevent occurrence of the reverse domain in short periods of time of about twenty seconds for heating and about ten seconds for cooling (a cooling rate of about 1.2° C./sec.) a square panel having a width of about 2 cm, though the periods of heating and cooling time are influenced by a heat capacity of the panel 11.

Figure 9:
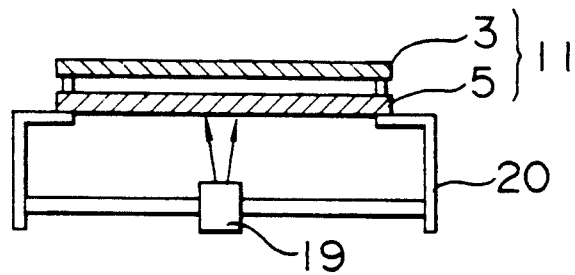
FIGS. 9 and 10 are cross-sectional views respectively showing crystal display panel apparatuses according to one embodiment of the present invention.
Figure 10:
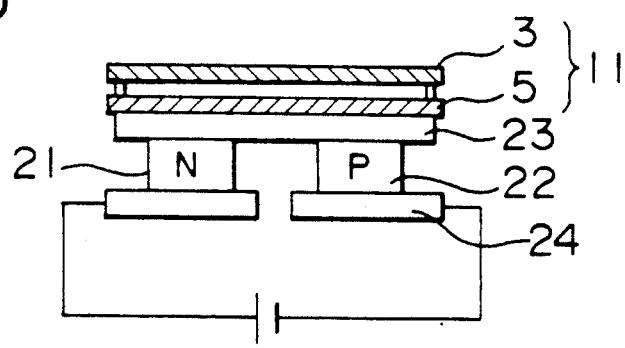
Figure 11:
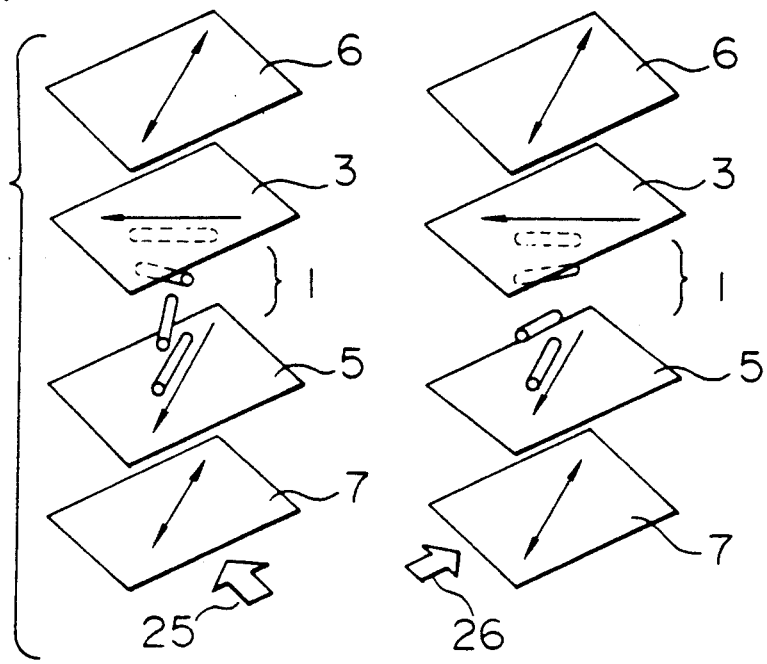
FIG. 11 is a perspective view indicating the viewing angle of a liquid crystal display panel.
Figure 12:
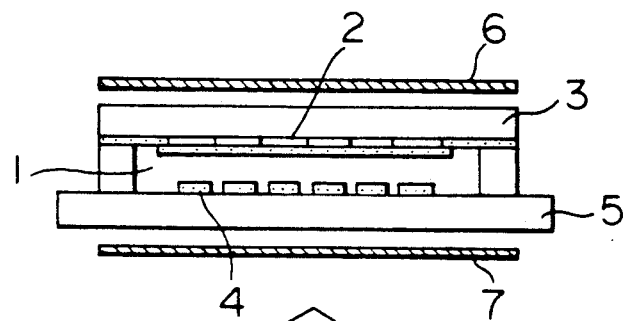
FIG. 12 is a cross-sectional view illustrating a construction of a conventional liquid crystal panel.

Referring to FIGS. 9 to 11, preferred embodiments of a liquid crystal display panel apparatus in which the simply constructed reverse domain prevention art according to the invention is incorporated, will be described hereinafter.

The liquid crystal display panel apparatus is provided with a liquid crystal display panel 11, a semiconductor laser 19 for irradiation of a laser beam from the back side of the panel 11 and a means for feeding cooled air or a cooling fan 20 attached to the substrate 5 formed with an element thereon (FIG. 9). Alternatively, as shown in FIG. 10, a thermomodule formed with an N-type semiconductor 21 and a P-type semiconductor 22 both having a good thermoelectric efficiency which are connected alternately and electrically thereto in series by means of metallic pieces, is provided on the panel 11, thereby making it possible to heat and cool the panel 11 by reversing an electric current. Additionally, the metallic pieces 23 and 24 are respectively attached to the semiconductors 21 and 22.

In such construction, if the strength of orientation of the panel 11 is previously weakened, the liquid crystal display panel can be freely designed to be clockwise or counterclockwise (the reverse domain), by regulating a cooling rate of the panel after heating the liquid crystal to a temperature higher than the N-I point. For example, in the case where the panel is oriented to twist the orientation of the liquid crystal clockwise and the panel is gradually cooled after heating with use of the liquid crystal LIXON-9510+CB15, a counterclockwise-twist (the reverse domain) panel can be obtained, and in the case of rapid cooling, a clockwise-twist panel can be obtained. In this way, according to the invention, a liquid crystal display panel apparatus variable in clockwise twisted direction can be provided. The features of the clockwise-twist and counterclockwise-twist liquid display panels are that angles of visibilities thereof are different from each other. More specifically, in the clockwise-twist display panel, the main visual field is along the arrow 25, and on the other hand, in the counterclockwise-twist display panel, the main visual field is along the arrow 26. The viewing angles of the clockwise-twist and counterclockwise-twist display panels turn vertically and transversely by an angle of 90°. Accordingly, a liquid crystal display panel having a variety of viewing angles can be constructed, making it possible to provide a liquid crystal display panel apparatus which is fit for various uses.

As mentioned above, according to the present invention, even in a panel which is difficult in orientation, such as a high density panel, a defect of the reverse domain can be prevented surely by a simple means for prevention of occurrence of the reverse domain. Further, such a liquid crystal display panel can be obtained that there is caused no damage when the strength of rubbing is increased for strengthening the orientation of the panel and a high manufacturing yield can be achieved.

By making use of the reverse domain and incorporated a generation and an extinction means in the display apparatus, a liquid crystal display panel apparatus in which a viewing angle of the panel is variable can be readily constructed.

What is claimed is:

1. A method of manufacturing a liquid crystal display panel including substrates which are disposed opposite to each other and which each have inner and outer surfaces, electrode layers formed respectively on said inner surfaces of said substrates and nematic liquid crystal material positioned between the substrates, comprising the steps of:

(a) heating said liquid crystal display panel to heat substantially all of said liquid crystal material up to a temperature above an isotropic temperature at which said liquid crystal material becomes isotropic; and (b) thereafter rapidly cooling the liquid crystal display panel at one of said substrates at a cooling rate higher than 1° C./second to cool substantially all of said liquid crystal material down to an anisotropic temperature at which said liquid crystal material becomes anisotropic.

2. A method as in claim 1, wherein said one of the substrates has a thin film transistor thereon and the other one of the substrates has a color filter formed thereon.

3. A method as in claim 1, further comprising the step of detecting a clearing point at which said liquid crystal material becomes clear, wherein said clearing point is obtained by detecting a change in quantity of light transmitted through said liquid crystal material.

4. A method as in claim 1, wherein step (b) includes cooling said liquid crystal material at one of said substrates after being heated in step (a), by pressing said liquid crystal display panel between first and second members having heat conductivities different from each other.

* * * * *